US010568018B1

(12) United States Patent
Sharma et al.

(10) Patent No.: US 10,568,018 B1
(45) Date of Patent: Feb. 18, 2020

(54) METHODS AND SYSTEMS FOR PREVENTING MESSAGE OVERLOADING IN WIRELESS NETWORKS

(71) Applicant: Sprint Spectrum LP, Overland Park, KS (US)

(72) Inventors: Ankur Sharma, Plano, TX (US); Yu Zhou, Herndon, VA (US); Noman Alam, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 21 days.

(21) Appl. No.: 15/957,017

(22) Filed: Apr. 19, 2018

(51) Int. Cl.
| *H04W 48/02* | (2009.01) |
| *H04W 28/02* | (2009.01) |
| *H04W 48/06* | (2009.01) |
| *H04W 8/22* | (2009.01) |
| *H04L 29/08* | (2006.01) |

(52) U.S. Cl.
CPC .............. *H04W 48/06* (2013.01); *H04L 67/12* (2013.01); *H04W 8/22* (2013.01); *H04W 28/0215* (2013.01)

(58) Field of Classification Search
CPC ......... H04L 67/12; H04L 47/12; H04L 47/32; H04W 8/22; H04W 28/0215; H04W 48/06; H04W 76/18; H04W 76/34; H04W 28/0289; H04W 48/02; H04W 48/08; H04W 4/70
See application file for complete search history.

(56) References Cited

U.S. PATENT DOCUMENTS

| 9,015,395 | B2 * | 4/2015 | Barclay | H04W 8/06 710/220 |
| 10,159,033 | B2 * | 12/2018 | Kotecha | H04W 48/02 |
| 10,419,603 | B1 * | 9/2019 | Davis | H04M 3/436 |
| 2012/0155257 | A1 * | 6/2012 | Tiwari | H04W 60/005 370/230 |
| 2015/0373630 | A1 * | 12/2015 | Giusto | H04W 48/16 455/434 |
| 2016/0337127 | A1 * | 11/2016 | Schultz | H04W 4/70 |
| 2017/0048746 | A1 | 2/2017 | Ronneke | |
| 2017/0171187 | A1 * | 6/2017 | Yin | H04L 63/083 |
| 2018/0199273 | A1 * | 7/2018 | Chun | H04W 48/14 |
| 2018/0213466 | A1 * | 7/2018 | Kotecha | H04W 48/02 |
| 2019/0132315 | A1 * | 5/2019 | Clark | H04L 63/0869 |
| 2019/0141563 | A1 * | 5/2019 | Ianev | H04W 4/70 |
| 2019/0261225 | A1 * | 8/2019 | Eswarakava | H04W 24/02 |

* cited by examiner

*Primary Examiner* — Ahmed Elallam (57) ABSTRACT

Systems, methods, and processing nodes are related to preventing message overloading in a wireless network. The method includes establishing, by the access node, the wireless connection with the wireless device. The method also includes forwarding, from the access node to a controller node, a network connection message from the wireless device. The network connection message requests connection to network services of the wireless network. Additionally, the method includes receiving, at the access node from the controller node, a message indicating that the wireless device is denied access to the network services. Also, the method includes terminating, at the access node, the wireless connection with the wireless device in response to receiving the message. The method further includes limiting, at the access node, an establishment of future wireless connections with the wireless device in response to receiving the message.

20 Claims, 7 Drawing Sheets

FIG. 6

METHODS AND SYSTEMS FOR PREVENTING MESSAGE OVERLOADING IN WIRELESS NETWORKS

TECHNICAL BACKGROUND

The Internet of Things (IoT) is a network of physical objects, machines, people and other devices, which are connected and able to communicate and exchange data for intelligent applications and services. This may include various fields such as connected cities, connected industries, connected transportation, connected home, connected heath care, etc. IoT is expected to grow rapidly in the near future and be the next revolution in the mobile network ecosystem. For example, an estimated 30 billion connected devices will be developed by 2025.

As the number of devices are connecting to and communicating via mobile networks, a number of challenges may arise. For example, wireless devices, such as IoT devices, may exhibit aggressive behavior in attempting to connect with the wireless network. That is, because of the hardware or software of the wireless devices, the wireless devices may repeatedly attempt to connect to the wireless network when the wireless devices are not authorized to use the services of the network. The repeated connection attempts may consume the wireless and computational resources of the wireless network.

OVERVIEW

Exemplary embodiments described herein include systems, methods, and processing nodes for preventing message overloading in a wireless network. An exemplary method for preventing message overloading includes receiving, from a wireless device, a request to establish a wireless connection with an access node in a wireless network. Further, the method includes establishing, by the access node, the wireless connection with the wireless device. The method also includes forwarding, from the access node to a controller node, a network connection message from the wireless device. The network connection message requests connection to network services of the wireless network. Additionally, the method includes receiving, at the access node from the controller node, a message indicating that the wireless device is denied access to the network services. Also, the method includes terminating, at the access node, the wireless connection with the wireless device in response to receiving the message. The method further includes limiting, at the access node, an establishment of future wireless connections with the wireless device in response to receiving the message.

An exemplary system for preventing message overloading in a wireless network includes a processing node, a memory device, and a processor coupled to the processing node. The processor configures the processing node to establish a radio connection with a wireless device. The processor further configures the processing node to receive, from a controller node, a message indicating that the wireless device is denied access to network services associated with the wireless network. The processor further configures the processing node to terminate the radio connection with the wireless device in response to receiving the message. The processor further configures the processing node to limit an establishment of future radio connections with the wireless device in response to receiving the message.

An exemplary processing node for preventing message overloading in a wireless network is configured to perform operations including receiving, from a wireless device via a wireless connection established with an access node, a network connection message from the wireless device. The network connection message requests connection to network services of the wireless network. The processing node is further configured to perform operations including determining that the wireless device is denied access to the network services of the wireless network. The processing node is further configured to transmitting, to the access node, a message indicating that the wireless device is to be released from the wireless connection. In response to the message, the access node limits an establishment of future wireless connections with the wireless device.

DETAILED DESCRIPTION

According to embodiments of the present disclosure, systems, methods, and processing nodes for preventing message overloading in a wireless network. Wireless devices, such as IoT devices, may exhibit aggressive behavior in attempting to connect with the wireless network. That is, because of the configuration of the wireless devices, the wireless devices may repeatedly attempt to connect to the wireless network when the wireless devices are not authorized to use the services of the network. The repeated connection attempts may consume the wireless and computational resources of the wireless network.

To address these issues, when a wireless device attempts a connection with the wireless network, an access node initially establishes a wireless connection, e.g., radio connection, with the wireless devices. After the wireless connection is established, the access node forwards a message to a controller node that requests access to network services of the wireless network. If the controller node rejects access to the wireless device, the controller node sends one or more messages indicating that the wireless device is denied access to the network services of the communication network. The one or more messages can include a rejection message informing the wireless device of denial of access and a release message informing the access node of the denial of access. In response, the access node terminates the wireless connection with the wireless device and limits an establishment of future wireless connections. The limits on the establishment of the future wireless connections include denying wireless connection attempts for a predetermined period of time.

Accordingly, the repeated connection attempts by an aggressive wireless device can be mitigated at the access node. This prevents the aggressive wireless device from consuming wireless connections of the access node and prevents repeated authentication processes at the controller node. As such, the network and computation capacity of the access node and the controller node can be more efficiently utilized.

These and additional operations are further described with respect to the embodiments depicted in FIGS. 1A, 1B, and 2-6 below.

Figure 1A:
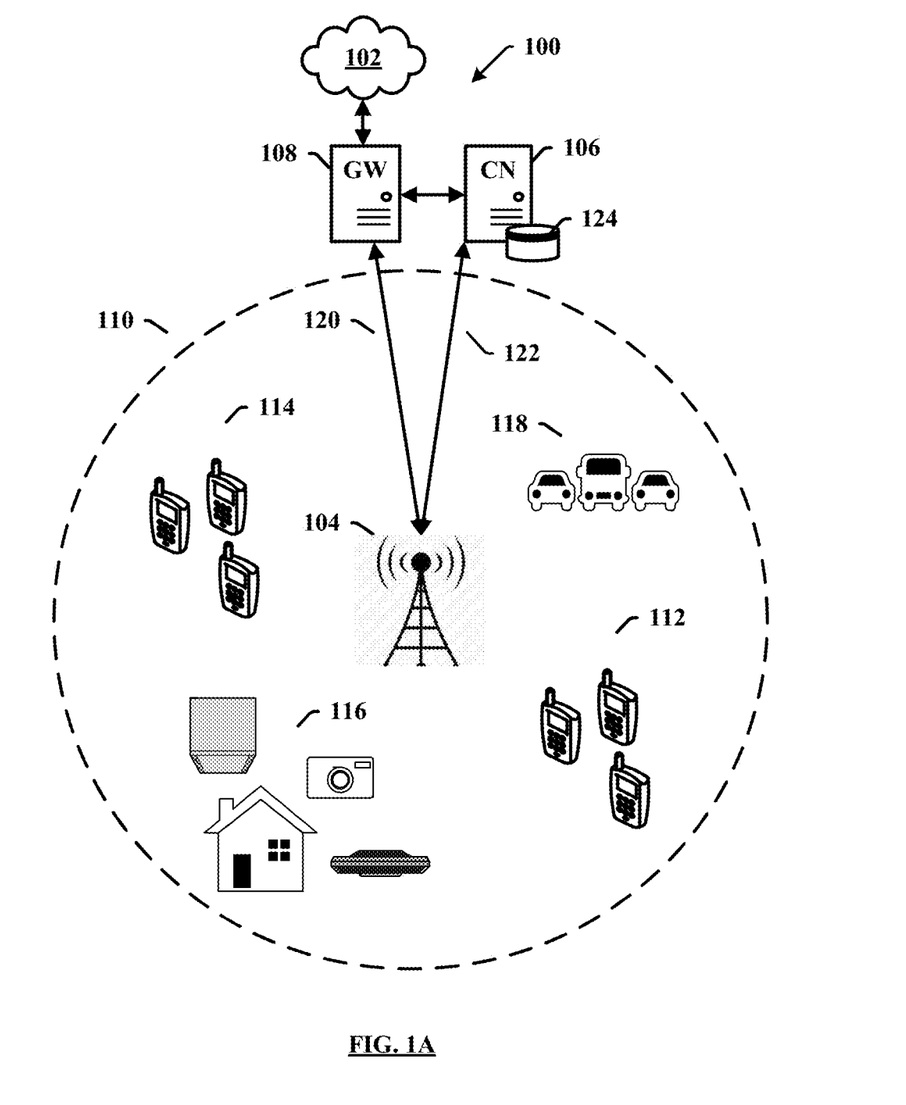
FIGS. 1A and 1B depict an example of a system for preventing message overloading in a wireless network, according to embodiments of the present disclosure.
Figure 1B:
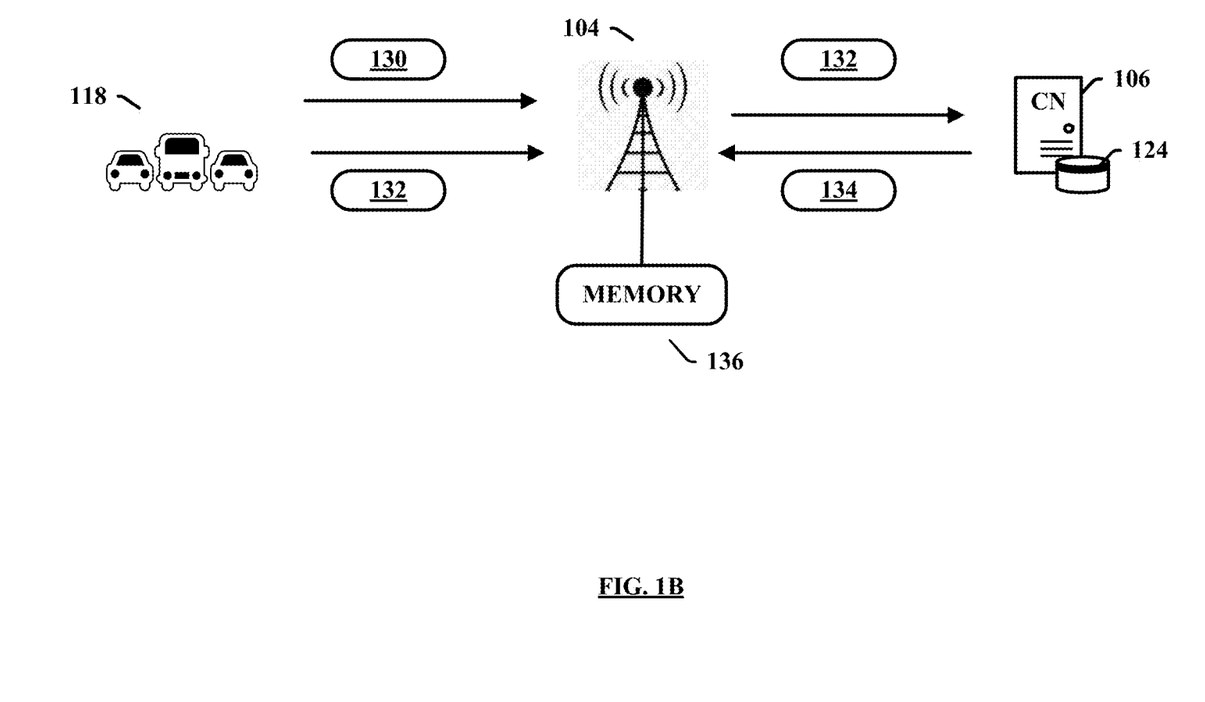

FIGS. 1A and 1B depict an example of a communication system 100 for preventing message overloading in a wireless network. While FIGS. 1A and 1B illustrate various components contained in the communication system 100, FIGS. 1A and 1B illustrate one example of a communications system and additional components can be added and existing components can be removed.

As illustrated in FIG. 1A, the communication system 100 includes a communication network 102, an access node 104, a controller node 106, and a gateway node 108. Other network elements can be present in the communication system 100 to facilitate communication but are omitted for clarity, such as base stations, base station controllers, mobile switching centers, dispatch application processors, and location registers such as a home location register or visitor location register. Furthermore, other network elements can be present to facilitate communication between the access node 104 and the communication network 102 which are omitted for clarity, including additional processing nodes, routers, gateways, and physical and/or wireless data links for carrying data among the various network elements.

The access node 104 is illustrated as having a coverage area 110. The access node 104 can serve wireless devices such as wireless devices 112, 114, 116, and 118. For example, the wireless devices 112 and 114 can include mobile phones, tablet computers, laptop computers, and the like. Likewise, for example, the wireless devices 116 and 118 can include IoT devices or machine-to-machine ("m2m") devices such as physical devices, vehicles, home appliances, and other items embedded with electronics, software, sensors, actuators, and connectivity which enables connection to the communication network 102 via the access node 104.

In embodiments, the IoT or m2m devices may not have a user interface, and the modem of the devices may be under full control of the application layer of the IoT or m2m devices. The application layer in IoT or m2m devices may always tend to acquire a network address, e.g., Internet Protocol ("IP") address, so that the device can provide the network services to a user if the device is powered. In some situations, the wireless devices 112, 114, 116, 118 may not be allowed to "camp" on the communication system 100, e.g., maintain a connection to the access node 104 and/or communication network 102, for example, if the communication system 100 is in maintenance mode, is in congestion mode, or is limiting camping for other reasons. In this case, the wireless devices 112, 114, 116, 118, e.g., IoT and/or m2m devices, can repeatedly make connection attempts under the influence of application layer, for example, because the connection attempts are not controlled by wireless connection standards, e.g., 3GPP. For example, the modem may be certified and meets 3GPP guidelines, but IoT or m2m devices may control the modem behavior with open application programming interface ("APP").

In typical connection procedures, after the wireless devices 112, 114, 116, and 118 initially establishes a wireless connection to the access node 104, the access node 104 forwards a connection message to the controller node 106 to establish connection to the services of the communication network 102. If one of the wireless devices 112, 114, 116, and 118 is not allowed access, the controller node 106 transmits a rejection message to the wireless devices 112, 114, 116, and 118, for example, an "attach reject" or "tracking area update (TAU) reject." In this case, the wireless devices 112, 114, 116, and 118 must adhere to a rejection message as per a reject cause code ("CC"), for example, as defined a wireless standard, e.g., 3GPP.

A CC can refer to permanent failures or temporary failures. Permanent CC are long term failures and have been identified by wireless standards. In the case of a permanent failure, a modem/chipset of the wireless devices 112, 114, 116, and 118 follow guidelines set by the standard—what the wireless device does in response and how the network acts after CC is issued. Temporary failures are the failures which are for short durations, e.g., congestion, service is out for some time, maintenance mode, etc. Table 1 illustrates examples of CCs.

TABLE 1

| Reject | CC# | Description | Solution |
| --- | --- | --- | --- |
| Attach | #7 | Evolved Packet System (EPS) services not allowed | Power cycle |
| Attach | #3 | Illegal wireless device | Power cycle |
| TAU | #3 | Illegal wireless device | Power cycle |
| Attach | #84 | Authentication reject | Power cycle |
| Attach | #77 | Service reject | Power cycle |
| Attach | #14 | EPS services not allowed in this public land mobile network (PLMN) | Power cycle |
| Attach | #17 | Network Failure | Temporary Failure |
| Attach | #22 | Congestion | Temporary Failure |

After each CC rejection, the wireless devices 112, 114, 116, and 118 controls the number of connection attempts, e.g., how frequent the attach attempts should be made. For example, the wireless devices 112, 114, 116, and 118 can maintain a back-off timer to control the requests timing. In these cases, the wireless devices 112, 114, 116, and 118 attempt service connections by balancing and equal weighting among hard or soft reset and the back-off timer. In other words, both must be tried turn by turn to resolve the failure in successful attach and get the IP address.

In some cases, IoT and m2m devices may be controlled by application layers where standards, e.g., 3GPP, do not govern connection attempts. Because of this, the communication system 100 may encounter a challenge to control aggressive behavior, e.g., continuous attempts to connect, because the connection messages are transparent to the access node 104, establishing the wireless network, and go directly to the controller node 106. This, however, may add wastage of transport and computation power to handle such type of requests from communication system 100 perspective. For example, when an IoT device has overdue bills and is not aware, the IoT device may continuously send the registration messages to the controller node 106 and try to start IoT communications with IoT servers. As a result, the controller node 106 deals with repeated registration messages and sends back rejection messages in response to each. Additionally, the access node 104 may unnecessarily maintain a wireless connection with the IoT device.

In embodiments, the communication system 100 can prevent message overloading due to the repeated connection attempts by the wireless devices 112, 114, 116, and 118.

When one of the wireless devices 112, 114, 116, and 118 attempts a connection with the communication system 100, the access node 104 initially establishes a wireless connection, e.g., radio connection, with the one of the wireless devices 112, 114, 116, and 118. After the wireless connection is established, the access node 104 forwards a message to the controller node 106 that requests access to the communication network 102. If the controller node 106 rejects access to one of the wireless devices 112, 114, 116, and 118, the controller node 106 sends a rejection message indicating that the one of the wireless devices 112, 114, 116, and 118 is denied access to the network services of the communication network 102. In response, the access node 104 limits an establishment of future wireless connections.

In embodiments, to limit establishment of future wireless connections, the access node 104 initiates a timer that tracks a predetermined period of time during which the access node 104 prevents the establishment of a wireless connection with the one of the wireless devices 112, 114, 116, and 118. For example, the access node 104 can initiate and monitor a back-off timer that increases the predetermined time period as a number of rejection messages are received. The access node 104 can also store an identification of the one of the wireless devices 112, 114, 116, and 118 associated with the timer.

In embodiments, as illustrated in FIG. 1B, a wireless device 118, for example, an IoT or m2m device, can initiate a wireless connection with the access node 104 by sending a connection message 130. The connection message 130 can include an identification of the wireless device 118 and details on the wireless connection to establish. For example, the wireless device 118 can initiate radio resource control ("RRC") connection with the access node 104, providing, for example, an LTE radio area network ("RAN"), and the access node 104 can complete the connection setup. In embodiments, the access node 104 can allow the wireless device 118 to establish an initial connection if the wireless device 118 has valid hardware or software, e.g., subscriber identify module ("SIM").

Then, the wireless device 118 can send a network connection message 132 to the controller node 106 via the wireless connection established with the access node 104. For example, the wireless device 118 can send an attach request through non-access stratum ("NAS") messaging via the successful RRC connection with the access node 104 to LTE core. The network connection message 132 can include an identification of the wireless device 118 and services requested. Once received, the controller node 106 can attempt to authenticate the wireless device 118. For example, the controller node 106 can compare the identification and services requested to a database, e.g., a database 124 to determine if the wireless device 118 can be authenticated.

If the controller node 106 cannot authenticate the wireless device 118, the controller node 106 can send one or more messages 134 that the wireless device 118 is denied access to the network services. The messages 134 can include a reject message to the wireless device 118 and a release message for the access node 104. The release message 104 allows the access node 104 to terminate the wireless connection with the wireless device 118 and to limit an establishment of future wireless connections with the wireless device 118. The messages 134 can include the identification of the wireless device 118 and a code indicating the reason for the rejection.

In embodiments, the messages 134 can include a release message if the wireless device is rejected for temporary reasons, permanent reasons, or combination thereof. For example, if the wireless device 118 fails authentication for reasons such as stolen device, international mobile subscriber identity ("IMSI") unknown, etc., the controller node can send an attach reject with CC such as #3 or #7 and a release message for the access node 104. Likewise, for example, if the wireless device 118 passes the above authentication but the controller node 106 still rejects because of un-paid bills or any permanent reason, the controller node 106 can send a release message to the access node 104 along or following the NAS attach reject message to the wireless device 118.

In embodiments, the access node 104 can forward the rejection message to the wireless device 118 via the wireless connection. Then, the access node 104 can terminate the wireless connection to the wireless device 118 in response to the release message and limit an establishment of future wireless connections with the wireless device 118. For example, the wireless device 118 can receive the rejection message with appropriate CC #, and the access node 104 can release the wireless device 118 from RRC layer.

In embodiments, the access node 104 can limit establishment of future wireless connection with the wireless device 118. For example, the access node 104 can deny establishment of a wireless connection for a predetermined period of time. Likewise, for example, the access node 104 can deny establishment of wireless connection until authorized by a network user or administrator. Likewise, for example, the access node 104 can permanently deny establishment of a wireless connection. To achieve this, the access node 104 can include a memory 136. Once a message 134 is received by the access node 104, the access node 104 can store an identification of the wireless device 118 in the memory 136. For example, the identification can include low access priority indicator LAPI as specified in 3GPP R-10, an IMSI, cell radio network temporary identifier ("C-RNTI"), SAE temporary mobile subscriber identifier ("S-TMSI"), or any other type of identification.

To limit future connection for a predetermined period of time, the access node 104 can initiate and monitor a timer, e.g., a back-off timer. For example, the access node 104 can increase the length of the predetermined period of time in response to additional rejections. As new connection requests are received from the same wireless device 118, the wireless device 118 uses the same identification (e.g., S-TMSI and/or C-RNTI, which are unique per device trying to camp on the network for any services) as long as such device is being served by same access node 104. The access node 104 can check the memory and match the requested identification of the wireless device 118 (e.g., S-TMSI/C-RANT ID) with the saved identification of wireless devices (e.g., S-TMSI and/or C-RNTI) to see if the rejection cause code is a permanent failure or not, and if timer, e.g., back-off timer, is expired or not. If the rejection cause code is permanent and the timer is not expired yet, the access node 104 can prevent such connections request from being forwarded to the controller node 106, that is, can simply reject the wireless device 118. The access node 104 only sends such a request to the controller node 106 for permanent cause code failure when the timer, e.g., back off-timer is expired. If time, e.g., back off timer, is expired and the access node 104 forwards the connection request to the controller node 106, but the controller node 106 still determines the same rejection cause code (e.g., permanent failure for unpaid bills or barred or stolen) then the access node 104 can enforce even larger timer, e.g., back-off timer of 24-72 hours. The access node 104 can deny wireless connection requests from the wireless device 118 until the timer has expired.

Accordingly, an aggressive wireless device can be forced to make new wireless connection requests because the wireless device 118 may be controlled by the application layer which further wakes up the modem to try another attempt to get an IP address. Moreover, because the access node 104 will not entertain the wireless connection establishment until the timer expires, the network and computation capacity of the access node 104 and the controller node 106 will be saved.

Returning to FIG. 1A, the communication network 102 can be a wired and/or wireless communication network. The communication network 102 can include processing nodes, routers, gateways, and physical and/or wireless data links for communicating signals among various network elements. The communication network 102 can include one or more of a local area network, a wide area network, and an internetwork (including the Internet). The communication network 102 can be capable of communicating signals, for example, to support voice, push-to-talk, broadcast video, and data communications by wireless devices 112, 114, 116, 118, etc. Wireless network protocols can include one or more of Multimedia Broadcast Multicast Services (MBMS), code division multiple access (CDMA) 1xRTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G NR, or 5G LTE). Wired network protocols utilized by the communication network 102 can include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). The communication network 102 can include additional base stations, controller nodes, telephony switches, internet routers, network gateways, computer systems, communication links, or other type of communication equipment, and combinations thereof.

The access node 104 can be any network node configured to provide communication between the wireless devices 112, 114, 116, and 118, and the communication network 102, including standard access nodes and/or short range, low power, small access nodes. For instance, the access node 104 can include any standard access node, such as a macrocell access node, base transceiver station, a radio base station, an eNodeB device, an enhanced eNodeB device, gNodeB (gNB), and the like. In other embodiments, the access node 104 can be a small access node including a microcell access node, a picocell access node, a femtocell access node, or the like such as a home NodeB or a home eNodeB device.

The access node 104 can include a plurality of antennae and transceivers for enabling communication using various operating modes and different frequency bands or carriers and establishing wireless connections and communication links, e.g., air interfaces, with the wireless devices 112, 114, 116, 118, and the like. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), and 5G—including combinations, improvements, or variations thereof. Moreover, it is noted that while the access node 104 is illustrated in FIGS. 1A and 1B, any number of access nodes, including relay nodes, can be implemented within the system 100.

The access node 104 can include a processor and associated circuitry to execute or direct the execution of computer-readable instructions to perform operations such as those further described herein. Briefly, the access node 104 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. Further, the access node 104 can receive instructions and other input at a user interface. The access node 104 communicates with the gateway node 110 and controller node 108 via communication links 120, 122. The access node 104 can communicate with other access nodes (not shown) using a direct link such as an X2 link or similar link.

The wireless devices 112, 114, 116, and 118 can be any device, system, combination of devices, or other such communication platform capable of communicating wirelessly with access nodes, such as the access node 104, using one or more frequency bands deployed therefrom. As discussed above, for example, the wireless devices 112 and 114 can be, for example, a mobile phone, a wireless phone, a wireless modem, user equipment (UE), a personal digital assistant (PDA), a voice over internet protocol (VoIP) phone, a voice over packet (VOP) phone, or a soft phone, as well as other types of devices or systems that can exchange audio or data via the access node 104. Likewise, for example, the wireless devices 116 and 118 can include IoT devices such as physical devices, vehicles, home appliances, and other items embedded with electronics, software, sensors, actuators, and connectivity which enables connection to the communication network 102. Other types of communication platforms are possible.

The controller node 106 can be any network node configured to communicate information and/or control information over the communication system 100. The controller node 106 can be configured to transmit control information associated with a handover procedure. The controller node 106 can be a standalone computing device, computing system, or network component, and can be accessible, for example, by a wired or wireless connection, or through an indirect connection such as through a computer network or communication network. For example, the controller node 106 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art will recognize that the controller node 106 is not limited to any specific technology architecture, such as LTE and can be used with any network architecture and/or protocol.

The controller node 106 can include a processor and associated circuitry to execute or direct the execution of computer-readable instructions to obtain information. The controller node 106 can retrieve and execute software from storage, which can include a disk drive, a flash drive, memory circuitry, or some other memory device, and which can be local or remotely accessible. In an example, the controller node 106 includes a database 124 for storing information for authenticating and allowing access to wireless devices 112, 114, 116, and 118, as discussed herein. This information can be requested by or shared with the access node 104, via wireless connections and communication links, wired communication links, X2 connections, and so on. The software can include computer programs, firmware, or some other form of machine-readable instructions, and can include an operating system, utilities, drivers, network interfaces, applications, or some other type of software, and combinations thereof. The controller node 108 can receive instructions and other input at a user interface.

The gateway node 108 can be any network node configured to interface with other network nodes using various protocols. The gateway node 108 can communicate user data over the communication system 100. The gateway node 108 can be a standalone computing device, computing system, or network component, and can be accessible, for example, by a wired or wireless connection, or through an indirect connection such as through a computer network or communication network. For example, the gateway node 108 can include a serving gateway (SGW) and/or a public data network gateway (PGW), etc. One of ordinary skill in the art will recognize that the gateway node 108 is not limited to any specific technology architecture, such as LTE and can be used with any network architecture and/or protocol.

The gateway node 108 can include a processor and associated circuitry to execute or direct the execution of computer-readable instructions to obtain information. The gateway node 108 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. The gateway node 108 can receive instructions and other input at a user interface.

The communication links 120, 122 can use various communication media, such as air, space, metal, optical fiber, or some other signal propagation path—including combinations, improvements, or variations thereof. The communication links 120, 122 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, GSM, CDMA, WiMAX, or LTE, —including combinations, improvements, or variations thereof. The communication links 120, 122 can include S1 communications links. Other wireless protocols can also be used. The communication links 120, 122 can be a direct link or might include various equipment, intermediate components, systems, and networks. The communication links 120, 122 can include many different signals sharing the same link.

In the embodiments and examples described above and below, the access node 104 and controller node 106 are described as performing the operations of preventing messaging overload in the communication network 100. In any of the embodiments and examples, however, other elements of the communication network 100 can perform any portion of the process described above.

Other network elements can be present in the communication system 100 to facilitate communication but are omitted for clarity, such as base stations, base station controllers, mobile switching centers, dispatch application processors, and location registers such as a home location register or visitor location register. Furthermore, other network elements that are omitted for clarity can be present to facilitate communication, such as additional processing nodes, routers, gateways, and physical and/or wireless data links for carrying data among the various network elements, e.g. between the access node 104 and the communication network 102.

Figure 2:
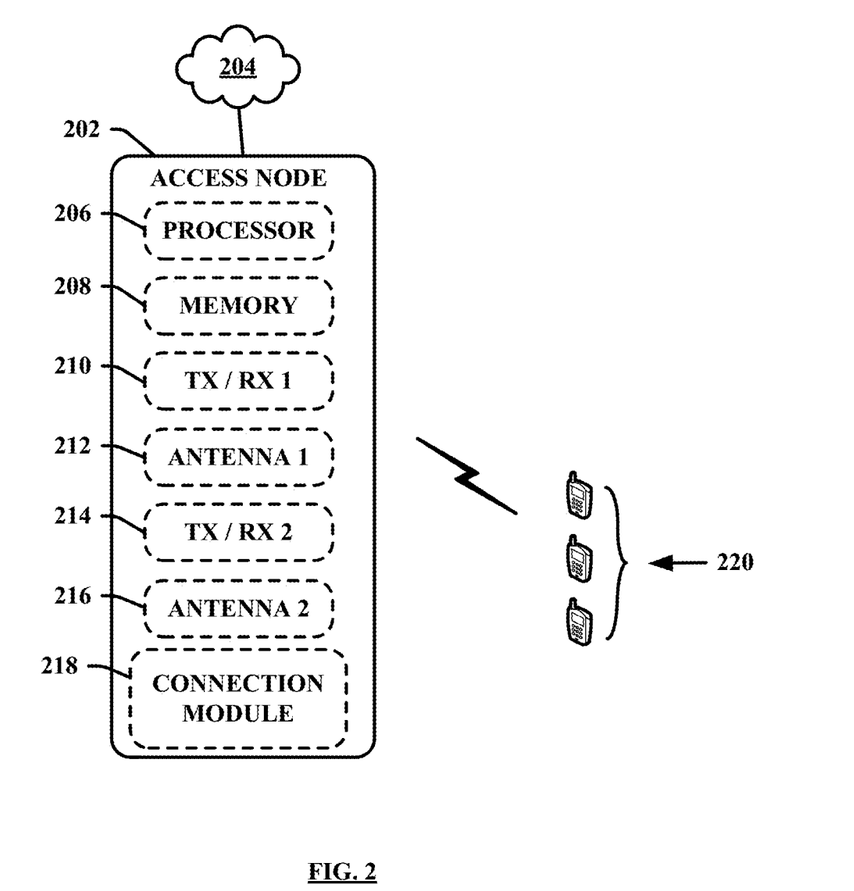
FIG. 2 depicts an example of an access node in a system for preventing message overloading in a wireless network, according to embodiments of the present disclosure.

FIG. 2 depicts components of an example of an access node 202 coupled to and communicating with a communication network 204. For example, the access node 202 and communication network 204 can be an example of the access node 104 and communication network 102, as illustrated in FIGS. 1A and 1B. In this example, the access node 202 includes a processor 206, a memory 208, a first transceiver 210, a first antenna 212, a second transceiver 214, and a second antenna 216. The access node 202 can also include a connection module 218 for performing the processes described herein.

As illustrated, the first transceiver 210, first antenna 212, second transceiver 214, and second antenna 216 can provide communication signals to provide an air link with wireless devices 220. For example, the wireless devices 220 can be examples of the wireless devices 112, 114, 116, and 118, as illustrated in FIGS. 1A and 1B. The antenna 212 (and/or the antenna 216) can be used to deploy a signal to communicate with the wireless devices 220 and establish a wireless connection and communication link. It should be understood that each antenna 214, 216 can comprise a plurality of antennae or antennae arranged in one or more arrays.

In embodiments, the connection module 218 can be configured to control the establishment of wireless connections, as described herein. In embodiments, the connection module 218 can be implemented as hardware, software, or combinations thereof. In one example, the connection module 218 can be implemented as a software program or module that includes logical instructions for performing the process described herein. In this example, a copy of the connection module 218 can be stored in memory 208 and the logical instructions of the connection module 218 can be executed by processor 206. Additionally, the memory, e.g., the memory 136, for storing the identification of the wireless devices, the CC, and the timer can be implement in the memory 208.

In another example, the connection module 218 can be implemented as a hardware unit contained within or coupled to the access node 202. In this example, the connection module 218 can include one or more processors and associated circuitry to execute or direct the execution of computer-readable instructions to perform operations and processes as described herein. The connection module 218 can retrieve and execute software, which includes logical instructions for performing the process described herein, from storage. The storage can include a disk drive, a flash drive, memory circuitry, or some other memory device, and which can be local or remotely accessible. The software can comprise computer programs, firmware, or some other form of machine-readable instructions, and can include an operating system, utilities, drivers, network interfaces, applications, or some other type of software, including combinations thereof.

While FIG. 2 illustrates the connection module 218 being a part of the access node 202, the connection module 218 can be a part of another device or system communicating with the access node 202. Likewise, the connection module 218 can be a stand-alone system or device that communicates with the access node 202.

Figure 3:
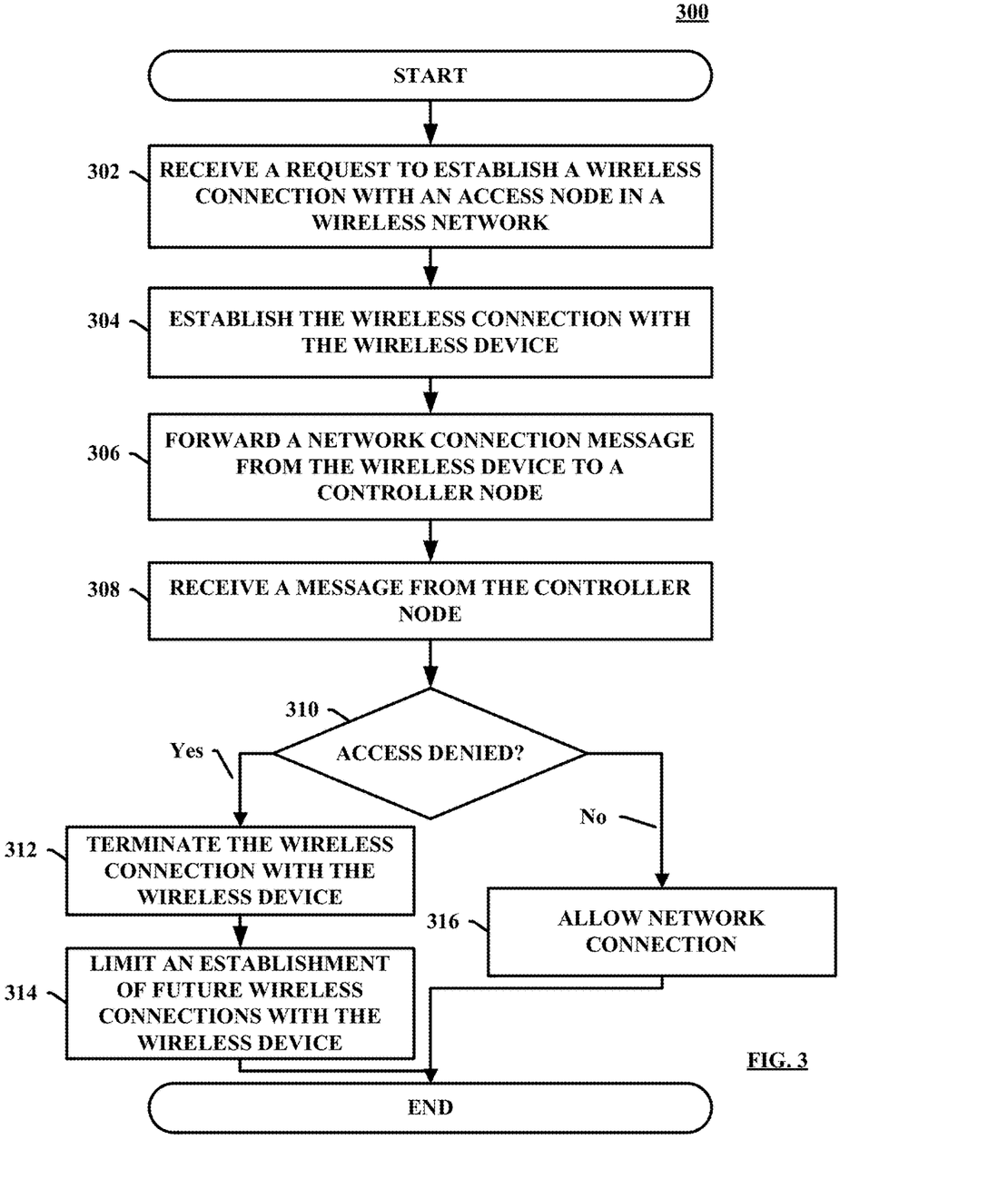
FIG. 3 depicts an example of a method for preventing message overloading in a wireless network, according to embodiments of the present disclosure.

FIG. 3 depicts an example of a method 300 for preventing message overloading in a wireless network. The method 300 of FIG. 3 can be implemented in any network node such as the access node 104, as illustrated in FIGS. 1A and 1B. In other embodiments, the method 300 can be implemented with any suitable network element, for example, any network element illustrated in FIG. 1A, FIG. 1B, or FIG. 2. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the process begins, in 302, a request to establish a wireless connection is received from a wireless device at an access node. The request can include an identification of the wireless device and a description or indication of the wireless connections supported by the wireless device.

For example, as illustrated in FIG. 1B above, a wireless device 118, for example, an IoT or m2m device, can initiate a wireless connection with the access node 104 by sending a connection message 130. The connection message 130 can include an identification of the wireless device 118 and details on the wireless connection to establish. For example, the wireless device 118 can initiate RRC connection with the access node 104, providing, for example, an LTE RAN, and the access node 104 can complete the connection setup.

In 304, the access node establishes a wireless connection with the wireless device. The access node can establish a wireless connection with the wireless device if the wireless device includes valid hardware or software. The wireless connection can be any type of wireless connection support by the wireless device and the access node, for example, GSM, CDMA, WiMAX, LTE, and 5G—including combinations, improvements, or variations thereof.

For example, referring to FIG. 1B, the access node 104 can allow the wireless device 118 to establish an initial connection if the wireless device 118 has valid hardware or software, e.g., SIM.

In 306, the access node forwards a network connection message from the wireless device to a controller node. The network connection message can include any necessary information to authenticate the wireless device and establish connection to the network services. In embodiments, the network connection message can include an identification of the wireless device and an identification of the network services requested.

For example, the wireless device 118 can send a network connection message 132 to the controller node 106 via the wireless connection established with the access node 104. The wireless device 118 can send an attach request through NAS messaging via the successful RRC connection with the access node 104 to LTE core. The network connection message 132 can include an identification of the wireless device 118 and services requested. Once received, the controller node 106 can attempt to authenticate the wireless device 118. For example, the controller node 106 can compare the identification and services requested to a database, e.g., a database 124 to determine if the wireless device 118 can be authenticated.

In 308, the access node receives a message from the controller node. In embodiments, the message can indicate whether the wireless device is denied or allowed access to the wireless network. The message can also include whether the wireless device should be released from the wireless connection. The messages can include the identification of the wireless device and a code indicating the reason for the rejection.

In embodiments, the message can include a single message or two separate messages—a reject message intended for the wireless device and a release message intended for the access node. The release message allows the access node to terminate the wireless connection with the wireless device and to limit an establishment of future wireless connections with the wireless device.

For example, referring to FIG. 1B, if the controller node 106 cannot authenticate the wireless device 118, the controller node 106 can send one or more messages 134 that the wireless device 118 is denied access to the network services. The messages 134 can include a reject message to the wireless device 118 and a release message for the access node 104. The release message 104 allows the access node 104 to terminate the wireless connection with the wireless device 118 and to limit an establishment of future wireless connections with the wireless device 118. The messages 134 can include the identification of the wireless device 118 and a code indicating the reason for the rejection.

Likewise, for example, the messages 134 can include a release message if the wireless device is rejected for temporary reasons, permanent reasons, or combination thereof. For example, if the wireless device 118 fails authentication for reasons such as stolen device, international mobile subscriber identity ("IMSI") unknown, etc., the controller node can send an attach reject with CC such as #3 or #7 and a release message for the access node 104. Likewise, for example, if the wireless device 118 passes the above authentication but the controller node 106 still rejects because of un-paid bills or any permanent reason, the controller node 106 can send a release message to the access node 104 along with or following the NAS attach reject message to the wireless device 118.

In 310, the access node determines whether access to the network services is allowed or denied. The access node can examine the message received from the controller node to determine whether the access is allowed or denied.

If the access is denied, in 312, the access node terminates the wireless connection with the wireless device. In 314, the access node limits an establishment of future wireless connection with the wireless device. In embodiments, the access node can deny establishment of a wireless connection for a predetermined period of time using, for example, a timer. In another embodiment, the access node can deny establishment of wireless connection until authorized by a network user or administrator. In another embodiment, the access node 104 can permanently deny establishment of a wireless connection.

For example, referring to FIG. 1B, the access node 104 can terminate the wireless connection to the wireless device 118 in response to the release message and limit an establishment of future wireless connections with the wireless device 118. For example, the wireless device 118 can receive the rejection message with appropriate CC #, and the access node 104 can release the wireless device 118 from RRC layer. The access node 104 can limit establishment of future wireless connection with the wireless device 118. For example, the access node 104 can deny establishment of a wireless connection for a predetermined period of time. Likewise, for example, the access node 104 can deny establishment of wireless connection until authorized by a network user or administrator. Likewise, for example, the access node 104 can permanently deny establishment of a wireless connection. To achieve this, the access node 104 can include a memory 136. Once a message 134 is received by the access node 104, the access node 104 can store an identification of the wireless device 118 in the memory 136. For example, the identification can include low access priority indicator LAPI as specified in 3GPP R-10, a IMSI, C-RNTI, S-TMSI, or any other type of identification.

To limit future connection for a predetermined period of time, the access node 104 can initiated and monitor a timer, e.g., a back-off timer. For example, the access node 104 can increase the length of the predetermined period of time in response to additional rejections. As new connection requests are received from the same wireless device 118, the wireless device 118 uses the same identification (e.g., S-TMSI and/or C-RNTI, which are unique per device trying to camp on network for any services) as long as such device is being served by same access node 104. The access node 104 can check the memory and match the requested identification of the wireless device 118 (e.g., S-TMSI/C-RANT ID) with the saved identification of wireless devices (e.g., S-TMSI and/or C-RNTI) to see if the rejection cause code is a permanent failure or not, and if timer, e.g., back-off timer, is expired or not. If rejection cause code is permanent and the timer is not expired yet, the access node 104 can prevent such connections request from being forward to the controller node 106, that is, can simply reject the wireless device 118. The access node 104 only sends such a request the controller node 106 for permanent cause code failure when the timer, e.g., back off-timer is expired. If time, e.g., back off timer, is expired and the access node 104 forwards the connection request to the controller node 106, but the controller node 106 still determines the same rejection cause code (e.g., permanent failure for unpaid bills or barred or stolen) then the access node 104 can enforce even larger timer, e.g., back-off timer of 24-72 hours. The access node 104 can deny wireless connection requests from the wireless device 118 until the timer has expired.

In the access is allowed, in 316, the network connection is allowed and the network services are accessed by the wireless device. At any point, the method 300 can end or return to any point.

Figure 4:
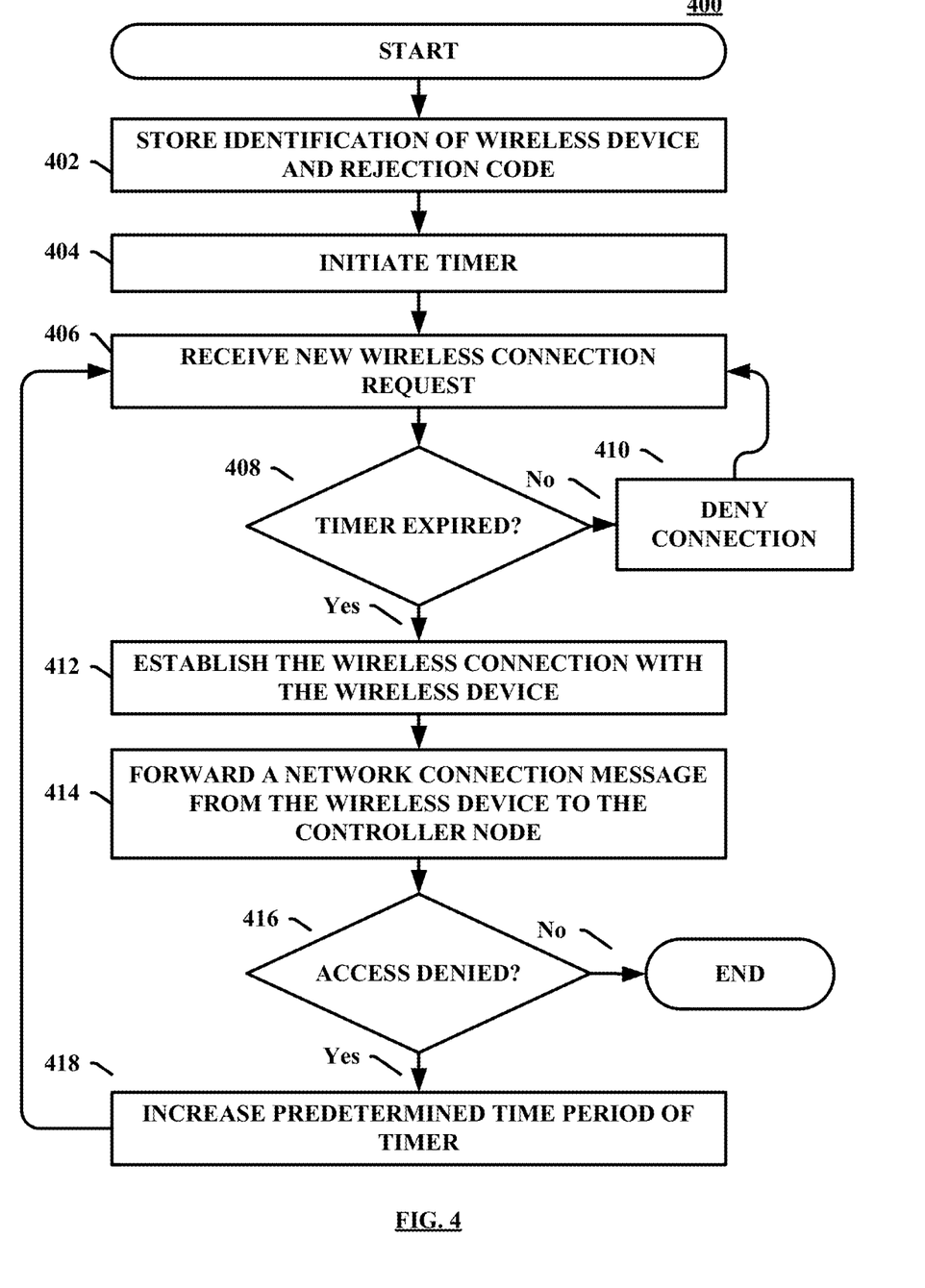
FIG. 4 depicts an example of a method for limiting wireless reconnection in a wireless network, according to embodiments of the present disclosure.

FIG. 4 depicts an example of a method 400 for limiting connections in a wireless network, for example, performed at 314 of method 300. The method 400 of FIG. 4 can be implemented in any network node such as the access node 104, as illustrated in FIGS. 1A and 1B. In other embodiments, the method 400 can be implemented with any suitable network element, for example, any network element illustrated in FIG. 1A, FIG. 1B, or FIG. 2 Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

In 402, once limiting begins, the access node stores an identification of the wireless device and a rejection code. In embodiments, the access node can store the identification in a memory device local to the access node. In embodiments, the identification can be any type of identification that uniquely identifies the wireless device, for example, LAPI as specified in 3GPP R-10, a IMSI, C-RNTI, S-TMSI, or any other type of identification. The rejection code can be any type of code that indicates a reason why the wireless device was rejected and possible actions to take.

For example, referring to FIG. 1B, the access node 104 can include the memory 136. Once a message 134 is received by the access node 104, the access node 104 can store an identification of the wireless device 118 and the rejection code in the memory 136. For example, the identification can include low access priority indicator LAPI as specified in 3GPP R-10, a IMSI, C-RNTI, S-TMSI, or any other type of identification. Likewise, for example, the rejection code can be CC established by the 3GPP.

In 404, the access node initiates a timer. In embodiments, the timer can be any type of data structure that track and monitors a predetermined period of time during which the wireless connection with the wireless device will be denied. In embodiments, the timer can be a timer in which the predetermined period of time changes as additional rejection messages are received, for example, a back-off timer.

In 406, the access node can receive new wireless connection requests for the wireless device. In 408, the access node can determine if the timer has expired. In 410, if the timer has not expired, the access node can deny the new wireless connection request. The method 400 can then return to 406 and await new wireless connection requests.

For example, to limit future connection for a predetermined period of time, the access node 104 can initiated and monitor a timer, e.g., a back-off timer. For example, the access node 104 can increase the length of the predetermined period of time in response to additional rejections. As new connection requests are received from the same wireless device 118, the wireless device 118 uses the same identification (e.g., S-TMSI and/or C-RNTI, which are unique per device trying to camp on the network for any services) as long as such a device is being served by the same access node 104. The access node 104 can check the memory and match the requested identification of the wireless device 118 (e.g., S-TMSI/C-RANT ID) with the saved identification of wireless devices (e.g., S-TMSI and/or C-RNTI) to see if the rejection cause code is a permanent failure or not, and if the timer, e.g., back-off timer, is expired or not. If the rejection cause code is permanent and the timer is not expired yet, the access node 104 can prevent such connection requests from being forward to the controller node 106, that is, the access node 104 can simply reject the wireless device 118. The access node 104 only sends such a request to the controller node 106 for permanent cause code failure when the timer, e.g., back off-timer is expired. If time, e.g., back off timer, is expired and the access node 104 forwards the connection request to the controller node 106, but the controller node 106 still determines the same rejection cause code (e.g., permanent failure for unpaid bills or barred or stolen) then the access node 104 can enforce even larger timer, e.g., back-off timer of 24-72 hours. The access node 104 can deny wireless connection requests from the wireless device 118 until the timer has expired.

If the timer has expired, in 412, the access node establishes the wireless connection with the wireless devices. After the connection is established, in 414, the access node forwards a method connection message for the wireless device to the controller node. In 416, the access node can determine whether access is denied by the controller node. The access node can establish the wireless connection, forward the message, and determine whether access is denied using processes as discussed above in method 300.

In 416, if access is granted, the process can end. The access node can end limiting the wireless connections with the wireless device. In embodiments, the access node can end the timer and remove the identification of the wireless device from memory.

If access is denied, in 418, the access node can increase the predetermine period of time of the timer. In embodiments, the timer can be a back-off timer and can increase the predetermined period of time using any type of algorithm, for example, exponential back-off.

At any point, the method 400 can end or return to any point.

Figure 5:
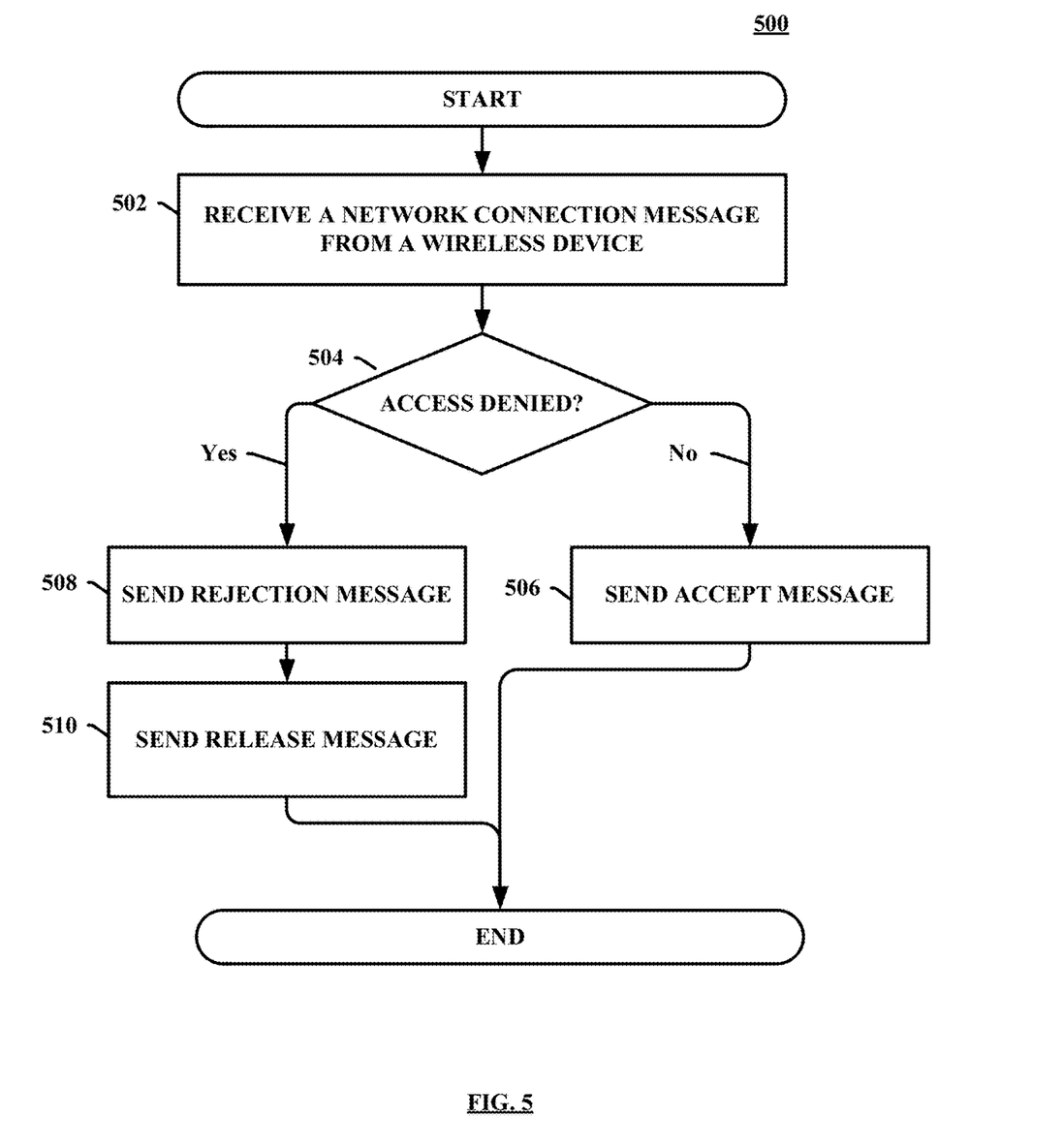
FIG. 5 depicts an example of another method for preventing message overloading in a wireless network, according to embodiments of the present disclosure.

FIG. 5 depicts an example of a method 500 for preventing message overloading in a wireless network. The method 500 of FIG. 5 can be implemented in any network node such as the controller node 106, as illustrated in FIGS. 1A and 1B. In other embodiments, the method 500 can be implemented with any suitable network element, for example, any network element illustrated in FIG. 1A, FIG. 1B, or FIG. 2 Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the process begins, in 502, the controller node can receive a network connection message from a wireless device. The network connection message can include any information necessary to authenticate the wireless device and establish a network connection. In embodiments, the network connection message can include an identification of the wireless device and the network services requested.

In 504, the controller node determines whether access to the network services are denied. In embodiments, the controller node can access one or more databases to determine whether the wireless device should be granted access to network services.

If access is granted, in 506, the controller node can send an acceptance message to the wireless device. If access is denied, in 508, the controller node can send a rejection message. In 510, the controller node can send a release message.

In embodiments, the message can include a single message or two separate messages—a reject message intended for the wireless device and a release message intended for the access node. The release message allows the access node to terminate the wireless connection with the wireless device and to limit an establishment of future wireless connections with the wireless device.

For example, referring to FIG. 1B, if the controller node 106 cannot authenticate the wireless device 118, the controller node 106 can send one or more messages 134 that the wireless device 118 is denied access to the network services. The messages 134 can include a reject message to the wireless device 118 and a release message for the access node 104. The release message 104 allows the access node 104 to terminate the wireless connection with the wireless device 118 and to limit an establishment of future wireless connections with the wireless device 118. The messages 134 can include the identification of the wireless device 118 and a code indicating the reason for the rejection.

Likewise, for example, the messages 134 can include a release message if the wireless device is rejected for temporary reasons, permanent reasons, or combination thereof. For example, if the wireless device 118 fails authentication for reasons such as stolen device, international mobile subscriber identity ("IMSI") unknown, etc., the controller node can send an attach reject with CC such as #3 or #7 and a release message for the access node 104. Likewise, for example, if the wireless device 118 passes the above authentication but the controller node 106 still rejects because of un-paid bills or any permanent reason, the controller node 106 can send a release message to the access node 104 along with or following the NAS attach reject message to the wireless device 118.

At any point, the method 400 can end or return to any point.

The methods, systems, devices, networks, access nodes, and equipment described above can be implemented with, contain, or be executed by one or more computer systems and/or processing nodes. The methods described above can also be stored on a non-transitory computer readable medium. Many of the elements described herein can be, comprise, or include computers systems and/or processing nodes. This includes, but is not limited to: the access node 104, the controller node 106, the gateway node 108, the wireless devices 112, 114, 116 and 118, and/or the network 102.

Figure 6:
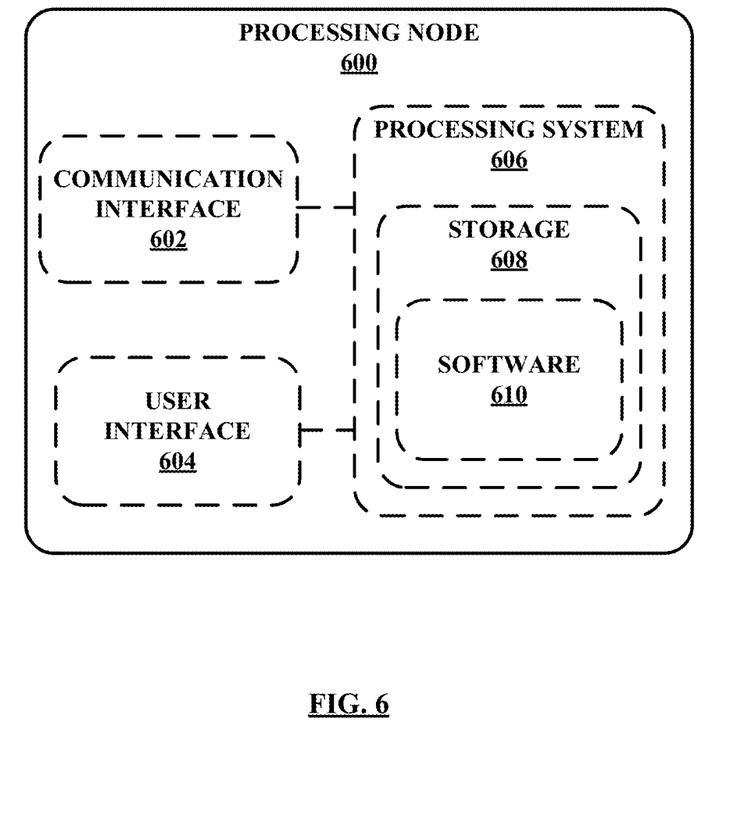
FIG. 6 depicts an example of a processing node for preventing message overloading in a wireless network, according to embodiments of the present disclosure.

FIG. 6 depicts an example of a processing node 600. The processing node 600 includes a communication interface 602, a user interface 604, and, a processing system 606 in communication with the communication interface 602 and the user interface 604. The processing system 606 includes storage 608, which can comprise a disk drive, flash drive, memory circuitry, or other memory device. The storage 608 can store software 610, which is used in the operation of the processing node 600. The storage 608 can include a disk drive, flash drive, data storage circuitry, or some other memory apparatus. For example, the storage 608 can include a buffer. The software 610 can include computer programs, firmware, or some other form of machine-readable instructions, including an operating system, utilities, drivers, network interfaces, applications, or some other type of software. For example, in some embodiments, the software 610 can include instructions to implement the method 300, as described above. For example, in some embodiments, the software 610 can include instructions to implement 400, as described above. Likewise, for example, in some embodiments, the software 610 can include instructions to implement 500, as described above.

The processing system 606 can include a microprocessor and other circuitry to retrieve and execute the software 610 from the storage 608. The processing node 606 can further include other components such as a power management unit, a control interface unit, etc., which are omitted for clarity. The communication interface 602 permits the processing node 600 to communicate with other network elements. The user interface 604 permits the configuration and control of the operation of the processing node 600.

The examples of systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium can include, for example, modulated signals transmitted through wired or wireless transmission paths.

While the teachings have been described with reference to examples of the embodiments thereof, those skilled in the art will be able to make various modifications to the described embodiments without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for preventing message overloading in a wireless network, the method comprising:
   receiving, from a wireless device, a request to establish a wireless connection with an access node in a wireless network;
   establishing, by the access node, the wireless connection with the wireless device;
   forwarding, from the access node to a controller node, a network connection message from the wireless device, wherein the network connection message comprises:
      an identification of the wireless device, and
      a request for connection to network services of the wireless network;
   comparing, at the controller node, the identification of the wireless device to a database;
   determining, at the controller node, the wireless device is not authenticated based on the comparing;
   receiving, at the access node from the controller node, a message indicating that the wireless device is denied access to the network services based on the determining;
   terminating, at the access node, the wireless connection with the wireless device in response to receiving the message; and
   limiting, at the access node, an establishment of future wireless connections with the wireless device for a predetermined period of time in response to receiving the message.

2. The method of claim 1, wherein limiting, at the access node, the establishment of future wireless connections comprises:
   preventing the establishment of future wireless connections.

3. The method of claim 1, the method further comprising:
   storing, at the access node, the identification of the wireless device in response to receiving the message, wherein the identification of the wireless device is utilized to limit the establishment of future wireless connections with the wireless devices.

4. The method of claim 3, the method further comprising:
   initiating a timer associated with the identification of the wireless device, wherein the timer tracks a predetermined period of time that the establishment of future wireless connections is prevented with the wireless device;
   receiving, at the access node, a new request to establish the wireless connection with the wireless network from the wireless device;
   determining whether the timer has expired; and
   preventing the establishment of the wireless connection in response to determining that the timer has not expired.

5. The method of claim 4, the method further comprising:
   increasing the predetermined period of time in response to receiving, at the access node from the controller node, additional messages indicating that the wireless is denied access to the network services.

6. The method of claim 4, the method further comprising:
   establishing the wireless connection in response to determining that the timer has expired;
   forwarding, from the access node to the controller node, a new network connection message from the wireless device, wherein the new network connection message requests connection to the network services of the wireless network;
   receiving, at the access node from the controller node, an acceptance message indicating that the wireless is granted access to the network services; and
   ending the timer and removing the identification of the wireless device from storage in response to receiving the acceptance message.

7. The method of claim 1, wherein the wireless device comprises an Internet-of-Things (IOT) device.

8. A system preventing message overloading in a wireless network, the system comprising:
   an access node comprising a processor configured to:
      establish a radio connection with a wireless device,
      receive, from the wireless device, an identification of the wireless device, and
      forward the identification of the wireless device to a controller node, the controller node configured to:
      compare the identification of the wireless device to a database,
      determine the wireless device is not authenticated based on the comparing, and
      transmit to the access node a message indicating that the wireless device is denied access to network services associated with the wireless network based on the determining;
   the processor further configured to:
      terminate the radio connection with the wireless device in response to receiving the message, and
      limit an establishment of future radio connections with the wireless device for a predetermined period of time in response to receiving the message.

9. The system of claim 8, wherein limiting the establishment of future radio connections comprises:
preventing the establishment of future radio connections.

10. The system of claim 8, further comprising a memory device coupled to the processor, wherein the processor is further configured to:
store, in the memory device, the identification of the wireless device in response to receiving the message, wherein the identification of the wireless device is utilized to limit the establishment of future radio connections with the wireless devices.

11. The system of claim 10, wherein the processor is further configured to:
initiate a timer associated with the identification of the wireless device, wherein the timer tracks the predetermined period of time that the establishment of future radio connections is prevented with the wireless device,
receive a new request to establish the radio connection with the wireless network from the wireless device,
determine whether the timer has expired, and
prevent the establishment of the radio connection in response to determining that the timer has not expired.

12. The system of claim 11, wherein the processor is further configured to increase the predetermined period of time in response to receiving, from the controller node, additional messages indicating that the wireless is denied access to the network services.

13. The system of claim 11, wherein the processor is further configured to:
establish the radio connection in response to determining that the timer has expired;
receive, from the controller node, an acceptance message indicating that the wireless is granted access to the network services; and
end the timer and remove the identification of the wireless device from memory device in response to receiving the acceptance message.

14. The system of claim 8, wherein the wireless device comprises an Internet-of-Things (IOT) device.

15. A processing node for preventing message overloading in a wireless network, the processing node being configured to perform operations comprising:
receiving, from a wireless device via a wireless connection established with an access node, a network connection message from the wireless device, wherein the network connection message requests connection to network services of the wireless network;
determining that the wireless device is denied access to the network services of the wireless network based on a comparison of an identification of the wireless device and a database; and
transmitting, to the access node, a message indicating that the wireless device is to be released from the wireless connection, wherein, in response to the message, the access node limits an establishment of future wireless connections with the wireless device for a predetermined period of time.

16. The processing node of claim 15, wherein the message comprises the identification of the wireless device and a code indicating why the wireless device is denied access to the network services.

17. The processing node of claim 15, the processing node being configured to perform operations further comprising:
transmitting, to the wireless device via the wireless connection established with the access node, a rejection message indicating that the wireless device is denied access to the network services of the wireless network.

18. The processing node of claim 15, the processing node being configured to perform operations further comprising:
receiving, from the wireless device via a wireless connection established with an access node, a new network connection message from the wireless device, wherein the new network connection message is received after a predetermined period of time maintained by the access node.

19. The processing node of claim 18, the processing node being configured to perform operations further comprising:
transmitting, to the access node, a new message indicating that the wireless device is allowed access to the network services, wherein, in response to the new message, the access node ends limiting the establishment of future wireless connections with the wireless device.

20. The processing node of claim 15, wherein the wireless device comprises an Internet-of-Things (IOT) device.

* * * * *